A. J. SHIRK AND S. COHEN.
STAND AND AUTOMATIC SWITCH FOR ELECTRIC IRONS.
APPLICATION FILED JAN. 28, 1920.
1,421,586.                           Patented July 4, 1922.
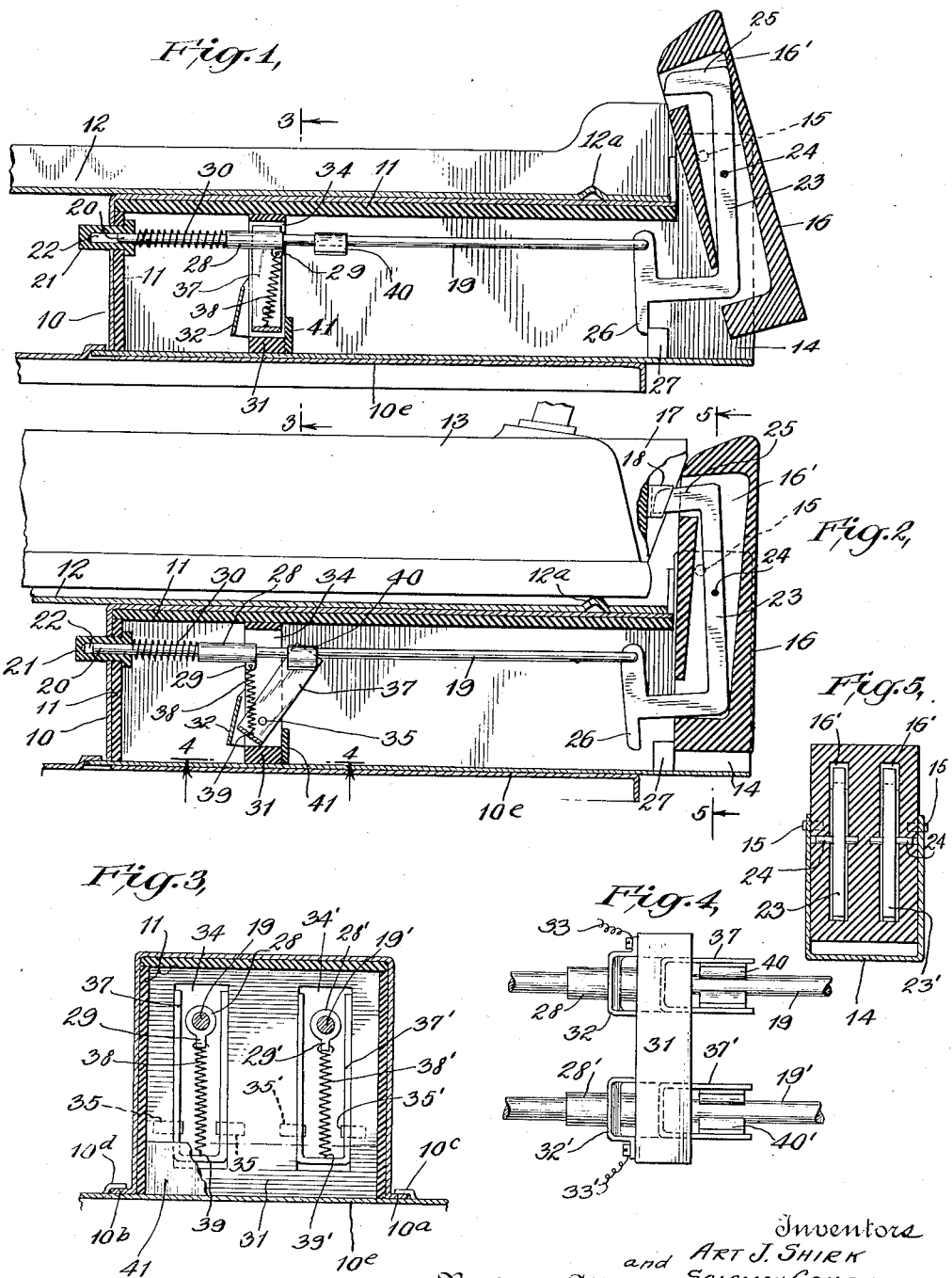

UNITED STATES PATENT OFFICE.

ART J. SHIRK AND SOLOMON COHEN, OF NEW YORK, N. Y., ASSIGNORS TO ABRAHAM S. ISERSON, OF NEW YORK, N. Y.

STAND AND AUTOMATIC SWITCH FOR ELECTRIC IRONS.

1,421,586.      Specification of Letters Patent.      Patented July 4, 1922.

Application filed January 28, 1920. Serial No. 354,616.

*To all whom it may concern:*

Be it known that ART J. SHIRK and SOLOMON COHEN, both citizens of the United States, and residents of the city of New York, in the county of New York and State of New York, have invented certain new and useful Improvements in Stands and Automatic Switches for Electric Irons, of which the following is a specification.

This invention relates to electric press irons.

One object of this invention is to provide in combination with an electric iron, an electric stand for supplying the current thereto having contact making means thereon for said iron normally shielded and concealed from view and adapted to be automatically moved from the shields into contact with the electric iron when the latter is positioned on the stand.

Other objects of this invention will be in part obvious and in part hereinafter pointed out.

Certain features herein shown and described are shown described and claimed in our co-pending application Serial No. 345,328, filed in the United States Patent Office on the 16th day of December 1910.

With the above exception the invention accordingly consists of the features of construction, combinations of elements and arrangement of parts which will be exemplified in the apparatus hereinafter described and the scope of application of which will be indicated in the following claims.

In the accompanying drawing in which is shown one of the various possible illustrative embodiments of this invention,—

Fig. 1 is a partial sectional view in elevation of our improved heating stand and automatic switch with the parts in "off" position; that is, with the heating iron or other such apparatus not in place on the stand;

Fig. 2 is a similar elevational cross section showing the parts in "on" position, that is with the iron on the stand and the circuit made through the iron;

Fig. 3 is a detailed cross sectional view cut along line 3—3 of Fig. 1;

Fig. 4 is a detailed cross sectional view cut along line 4—4 of Fig. 2; and

Fig. 5 is a cross sectional view cut along line 5—5 of Fig. 2 showing the rear of the iron in position on the stand.

Referring in detail to the drawing, 10 indicates a casing lined on the inside with insulating material such as 11, 11'. The casing is formed with flanges $10^a$ and $10^b$ whereby it may be secured as at $10^c$, $10^d$ to a supporting structure or work bench $10^e$. Mounted on the casing is a support 12 for the iron 13. The support is formed with raised portions $12^a$ (which may be heat insulated if desired) so that when the iron is placed in position on the stand as in Figure 2, it is in contact with the support only at a few points, thus reducing considerably the amount of heat conducted from the iron to the stand. If desired, the stand may further be spaced or otherwise heat insulated from the casing. The casing is formed with an extension or housing 14 to which is pivoted as at 15 an insulating casing 16 having a pair of recesses 16' for the purpose hereinafter set forth. The casing is overweighted at the top so that it normally tips over in oblique position as shown in Fig. 1. The iron is provided with a pair of contacts in any suitable manner. Thus, in the form shown in the drawing, the iron is formed at the rear with an extension 17 having sockets 18, which as will be of course understood are electrically connected to the heating coil in the iron (not shown.)

The automatic switch device will now be described. A pair of conducting rods 19, 19' extend within the casing 10 and each rod rests at one end 20 thereof in an insulating bushing 21 of such length as to permit of a clearance space 22 for a reciprocating longitudinal motion of the rods 19, 19'. A contact member 23, 23' preferably C-shaped is secured at the lower end of the C to the other ends of the rods 19, 19' respectively and is pivoted within the housing 14 at the vertical portion of the C as at 24 at a point below the pivotal point of the insulating casing 16. The upper portion 25 of the C forms a plug for the socket 18. The lower portion of the C has an extension 26 adapted to rest against a stop 27 when the iron is not in position on the support as in Figure 1. Mounted on each of the rods is a sleeve 28, 28' having an ear 29, 29'. A spring 30, one for each rod, is held between the bushing 21 of the sleeve 28 as is shown in the drawing. Secured in any suitable manner with the casing is the insulating block 31 carrying a pair of contact members 32, 32′ which are connected to the electric source of supply as by the lead wires 33, 33′. A pair of recesses 34, 34′ are formed in the block 31 and pivoted to the walls of these recesses as at 35, 35′ so as to swing in and out of these recesses are preferably U-shaped snap switch members or circuit makers 37, 37′. A pair of spring members 38, 38′ are each secured at one end to the ear 29 and at the other end to the corresponding switch member 37, 37′ at a point below the pivotal points 35, 35′ as at 39, 39′. A clip or other such contact member 40, 40′ is secured to each of the rods 19, 19′ and these contact members are adapted to receive the free end of the members 37, 37′ so that the latter may make electrical contact therewith. A stop 41 may be provided to limit the motion of the switch members 37, 37′ as will be readily understood from the drawing.

The operation of our heating stand and automatic switch will now be understood. When the iron is placed in position on the support as in Figure 2, the extension 17 on the rear of the iron pushes against the insulating casing 16 causing it to revolve about its pivot 15 from the position shown in Fig. 1 to that shown in Fig. 2, at the same time, the C-shaped contact members 23, 23′ are caused to rotate within the recesses 16′ about their pivots 24 by the forward push of the rear wall of the casing acting against these contact members. These contact members in consequence move forward from the position shown in Fig. 1 to that shown in Fig. 2 causing the rods 19, 19′ to move within the spaces 22 at the same time compressing the springs 30. This forward motion of the rods 19, 19′ at the same time produces a pull on the spring 38, 38′ which acting below the pivotal points 35, 36 of the switch members 37, 37′ cause the same to revolve about these pivotal points and quickly snap into the contact clips 40, this completing the circuit through the rods 19, 19′ and the contact members 23, 23′ and the sockets 18, 18′ in the rear of the iron through to the heating coil thereof (not shown).

When the iron is removed from the stand, the expansion of the spring 30 forces the rods 19, 19′ to move rearward until the clips 40 pass into position shown in Fig. 1 out of contact with the members 37, 37′ which snap back into "off" position shown in Fig. 1 by the reverse action of the springs 38, 38′, the movement of the clip 40 and the back-pulls exerted by the springs 38, 38′ co-operating to effect an accelerated snap motion of the switch member 37, 37′ as will be readily understood. At the same time, the contact members 23, 23′ move rearward into the casing and the pivot 24 being below the center 15 the casing is moved forward and caused to tip into the position shown in Fig. 1 by the rearward push exerted on the pivot.

The disposition and dimensioning of the various parts involved in this operation are such that the circuit is broken by the snap switch members 37, 37′ before the contact members 23, 23′ move completely out of contact with the sockets 18, 18′ on the rear of the iron. Similarly, when the iron is placed in position on the stand, these contact members move into the sockets before the circuit is made by the operation of the break-snap switch 37, 37′. In this way arcing at the contacts is prevented.

It will thus be seen that there is provided apparatus in which the several objects of this invention are achieved and which is well adapted to meet the conditions of hard practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:—

1. In combination with an electric sad iron having contacts thereon, an electric heating stand having electrical contact members for said contacts, and means adapted to be operated by the iron when being placed in position on the stand to connect said contact members to the electric supply and to said contacts on the iron, said means comprising a conducting member carrying a contact member, a circuit making member for the latter pivoted below said conducting member and a spring member secured at one end to said circuit making member below the pivotal center thereof and at the other end to said conducting member, whereby a lateral displacement of said conducting member snaps said circuit making member into and out of contact with said contact member on said conducting member.

2. In an electric heating stand for sad irons and the like, an automatic quick-break switch mechanism comprising a conducting rod, a contact member secured to said rod, a pivoted circuit-making member having the pivotal point thereof offset from said rod, means for connecting said circuit-making member to the electric supply, and a contact member on said rod for said circuit-making member.

3. In an electric heating stand for sad irons and the like, a support for the iron, a casing, a rod extending in said casing, a contact member pivoted adjacent the support and secured at one end to said rod, a pivoted circuit-making member having the pivotal point thereof offset from said rod, means for connecting said circuit-making member to the electric supply, a contact member on said rod adapted to make contact with said circuit-making member and means for normally maintaining said circuit-making member out of contact with said contact member on said rod.

4. In an electric heating stand for sad irons and the like, a support for the iron, a casing, a rod extending in said casing, a contact member pivoted adjacent the support and secured at one end to said rod, a pivoted circuit-making member having the pivotal point thereof offset from said rod, means for connecting said circuit-making member to the electric supply, a contact member on said rod adapted to make contact with said circuit-making member, means for normally maintaining said circuit-making member out of contact with said contact member on said rod, and means for normally maintaining said circuit making member out of contact with said contact member on said rod.

5. In an electric heating stand for sad irons and the like, a support for the iron, a casing, a rod extending in said casing, a contact member pivoted adjacent the support and secured at one end to said rod, a pivoted circuit-making member having the pivotal point thereof offset from said rod, means for connecting said circuit-making member to the electric supply, a contact member on said rod adapted to make contact with said circuit-making member, means for normally maintaining said circuit-making member out of contact with said contact member on said rod and means operated by the iron when being placed in position on the support for laterally displacing said rod.

6. In an electric heating stand for sad irons and the like, a support for the iron, a casing, a rod extending in said casing, a contact member pivoted adjacent the support and secured at one end of said rod, a pivoted circuit-making member having the pivotal point thereof offset from said rod, means for connecting said circuit-making member to the electric supply, a contact member on said rod adapted to make contact with said circuit-making member, means for normally maintaining said circuit-making member out of contact with said contact member on said rod, means operated by the iron when being placed in position on the support for laterally displacing said rod, and means for returning said rod to normal position when the iron is removed from the stand.

7. In an electric heating stand for sad irons and the like, a support for the iron, a casing, a rod extending in said casing, a contact member pivoted adjacent the support and secured at one end to said rod, a pivoted circuit-making member having the pivotal point thereof offset from said rod, means for connecting said circuit-making member to the electric supply, a contact member on said rod adapted to make contact with said circuit-making member and means whereby said contact member and circuit-making member may be simultaneously moved in opposite directions relative to each other.

8. In combination with an electric sad iron having contacts thereon, an electric heating stand, means for connecting said stand to the electric supply and means for electrically connecting to the stand the contacts on the iron comprising a pair of pivoted contact members, a pair of conducting rods secured thereto, contact-making means on said conducting rods for connecting the same to the electric supply, said contact members adapted to be operated by the iron as the latter is placed in position on the stand to laterally displace said rod to bring the contact making means thereon into contact with the electric supply.

9. In an electric heating stand for sad irons and the like, an automatic quick-break switch mechanism comprising a conducting rod, a contact member secured to said rod, a pivoted circuit-making member having the pivotal point thereof offset from said rod, means for connecting said circuit-making member to the electric supply, a contact member on said rod for said circuit-making member, and a spring member secured at one end to said circuit-making member below the pivotal center thereof and at the other end to said conducting member, whereby a lateral displacement of said conducting member snaps said circuit-making member into and out of contact with said contact member on said conducting rod.

10. In a device of the character described, in combination with an electric iron having a heating coil, a contact member for leading current into said coil, and a casing normally concealing said contact, said contact and casing being arranged to be simultaneously separated from each other so as to free a portion of said contact member.

11. In combination with an electric iron having electric contacts thereon, an electric stand, means for leading current to said stand, a contact member in electric connection with said current leading means, a casing normally shielding said contact member, said contact member and casing being arranged to be moved from each other upon the positioning of the iron on the stand so as to free the contact member from the casing and make contact with the contacts on the iron.

Signed at New York city, in the county of New York and State of New York this 31st day of December A. D. 1919.

ART J. SHIRK.
SOLOMON COHEN.